United States Patent [19]

Anderson

[11] Patent Number: 5,074,119
[45] Date of Patent: Dec. 24, 1991

[54] DEHUMIDIFIER APPARATUS WITH PUMP AND METHOD

[76] Inventor: John C. Anderson, 31 Blueberry Hill Rd., Hyannis, Mass. 02601

[21] Appl. No.: 518,789

[22] Filed: May 4, 1990

[51] Int. Cl.⁵ .............................................. F25D 23/14
[52] U.S. Cl. ...................................... 62/150; 62/285; 62/291; 417/40; 417/411
[58] Field of Search ................... 417/40, 411; 62/291, 62/285, 150

[56] References Cited

U.S. PATENT DOCUMENTS

| | | | |
|---|---|---|---|
| 2,627,669 | 2/1953 | Candor | 62/285 |
| 3,199,307 | 8/1965 | Willis . | |
| 3,758,236 | 9/1973 | Zimmerman | 417/40 |
| 4,135,370 | 1/1979 | Hosoda et al. | 62/92 |
| 4,218,195 | 8/1980 | Shure | 417/411 |
| 4,255,937 | 3/1981 | Ehrlich | 62/291 |
| 4,603,489 | 8/1986 | Goldberg . | |

Primary Examiner—Albert W. Davis, Jr.
Attorney, Agent, or Firm—Thomas A. Kahrl

[57] ABSTRACT

The present invention provides a pump for automatic and continuous emptying of water condensate from a dehumidifier positioned below ground level or remotely from a gravity drain. The present invention includes a small electrical pump powered by a 12 volt DC power source to prevent electrical shock, includes an on/off float switch connected with the power source, in cooperation with a flexible hose of small diameter of variable length. Condensate collected in the water collection pan is withdrawn at a preselected water level by the pump and passes through the tubing to an elevated or remote drain means or to other appropriate areas for disposal. The present invention permits continuous operation of portable dehumidifiers which would otherwise shut off when the condensate water pan fills after approximately one day's unattended use.

6 Claims, 1 Drawing Sheet

DEHUMIDIFIER APPARATUS WITH PUMP AND METHOD

BACKGROUND OF THE INVENTION

Portable dehumidifiers have been found useful in controlling the moisture content in the air contained in interior rooms of buildings. Use of dehumidifiers has been found particularly beneficial in removing excess moisture which otherwise causes damage to articles stored or contained in such interior rooms due to the formation of mildew or mold on such articles. In modern buildings where storage space is scarce, cellars have increasingly been used for storage as well as living spaces, despite the fact that cellars, at certain times of the year; are generally known to be damp, located below grade level, lacking access to sunlight, and having porous cement walls, typically are damp. Such spaces are probably the most appropriate spaces for dehumidification, and homeowners frequently employ portable dehumidifiers to overcome problems of excess moisture, however most cellars lack drains to carry away condensate collected by the dehumidifier.

Prior art dehumidifiers such as shown in U.S. Pat. Nos. 2,627,669, 3,199,307, 4,135,370 and 4,603,489 typically have gravity drains to permit continuous operations. Alternatively, portable dehumidifiers typically employ drip pans which are used to collect liquid condensate to be emptied once a day when the pan is filled, with a shut off mechanism to turn the dehumidifier off in the event the pan is not emptied on a daily basis. Emptying the pans requires removal of the pan from the dehumidifier which is heavy when filled with water with risk of spillage and carrying the pan upstairs or out of doors, to be followed by the return of the pan reinstallation, all of which is laborious and time consuming.

Inasmuch as most cellars are below the drain outlet for the house, the gravity feed of the prior art dehumidifiers cannot be used. Consequently the vast majority of portable dehumidifiers installed in the cellar, basement or rooms not having access to a drain, must be emptied daily by the user at great inconvenience. If left unattended the dehumidifier ceases operation upon the filling of the pan.

It is therefore desirable to provide a simple, effective, portable dehumidifier apparatus and pump in order to provide for improved drainage, particularly when located in rooms located below grade such as a cellar or basement.

SUMMARY OF THE INVENTION

This invention relates to an improved dehumidifier apparatus with pump pack apparatus for providing for the controlled removal of liquid condensate from a portable dehumidifier and a method for controlled removal of condensate from a portable dehumidifier.

In particular, the invention concerns automatic removal, preferably by pumping, of accumulated condensate in portable dehumidifiers by means of an electrical submersible pump wherein the dehumidifier is located below or away from access to available drainage systems.

A simple, inexpensive, pump pack apparatus has been discovered for use in combination with a portable dehumidifier apparatus for automatic controlled pumping of accumulated condensate, typically in the form of water from a collection pan in the portable dehumidifier apparatus which is positioned below available drainage, such as in cellars. The dehumidifier apparatus typically comprises a housing, having an upper chamber and a lower chamber, the upper chamber having an air inlet and an air outlet, a dehumidifier means provided in the upper chamber together with a circulating fan for drawing outside air into the upper chamber for contacting the dehumidifier means, the dehumidifier means adapted to remove moisture from surrounding air to form a liquid condensate in the form of droplets which have a natural tendency to drop from the dehumidifier means downwardly into the lower chamber, a collection pan mounted in the lower chamber for the accumulation of droplets of liquid condensate, a float means to sense the level of condensate in the collection pan, to alternatively energize the dehumidifier means for removing moisture from the air with condensate being collected in the drain pan until the collection pan becomes filled, whereupon the switch, typically a pressure switch or alternatively a float operated switch means deenergizes the dehumidifier means to prevent the pan from over flowing, and an improved pump pack apparatus to drain liquid condensate from the pan. The dehumidifier apparatus also includes a plurality of wheels positioned on the base of the lower chamber for the portable movement of the apparatus to a location characterized by high humidity, typically a basement space. The collection pan is of generally rectangular construction typically consisting of a lightweight plastic material and is removably disposed within the lower chamber at the base thereof extending over the entire base area for collecting condensate dripping downwardly from the dehumidifier means.

The pump pack apparatus is adapted to be connected electrically to a power source and comprises a 12 volt DC power pack for converting the conventional electric power of 110 volts AG to 12 volts DC, connected to a pump means, the pump means being positioned in the condensate pan and removably attached thereto to be submerged in the collected condensate and to pump the liquid condensate from the pan to an elevated drain system, a float switch means connected to the pump means for controlling the pump means to be activated for pumping when the pan is full and for deenergizing the pump means when the condensate has been completely pumped from the condensate pan, the float switch means being activated to pump at predetermined level of liquid condensate in the pan, and a tubing means of small diameter extending from the pump means to an elevated drain system. The DC power pack is adapted to convert conventional 110 volt AC power to 12 volt DC power to provide a safeguard against electrical shock. The pump means typically comprises an electrical submersible pump which is adapted to be submerged in the water and connected to the 12 volt DC power pack for operating while being submerged in the water. The float switch means is adapted to operate the pump means intermittently to reduce the level of condensate in the pan from a higher filled level to a low empty level by pumping the condensate to an elevated or remote drain, typically a casement window provided access to the outside environment such as a section of lawn or alternatively to a remote drainage system, to permit continuous operation of the dehumidifier apparatus to continuously remove moisture from the air of the room or space in which the dehumidifier is located. The pump pack means includes a convertor for converting the power source to a low voltage power such that the danger of shock is reduced associated with operating an electrical pump in a submerged location. The power pack also includes an attachment means for attaching the pump pack to the dehumidifier. The pump pack further includes an on/off switch positioned in the condensate drain pan and for sensing the water level and for activating the pump means.

In another embodiment of the present invention, the 110 AC volt power outlet is connected directly to a circuit contained in the dehumidifier called a full pan circuit such that when the full pan light is energized Power is supplied to the 12 volt DC power pack and operates the pump until enough water is pumped out of the pan so the dehumidifier may resume operation. Typically at such time as the float pressure switch indicates that the pan is full, the dehumidifier is deenergized until such time as the water level in the pan is lowered by the pumping action. In the alternate embodiment, the full light circuit is utilized for energizing and deenergizing the pump, whereas in the prior embodiment, the float switch is used to energize and deenergize the pump.

The method of the invention comprises the controlled pumping of condensate by pump means from a dehumidifier to a drain which method includes attaching a pump pack means to a dehumidifier apparatus including a dehumidifier means and a condensate drain pan, for passing moisture laden air across the dehumidifier means for collecting condensate droplets from the dehumidifier in a pan, submerging an electric pump in the pan, intermittently energizing the pump means responsive to a switch means adapted to remove fluid condensate in the pan and connecting the pump means by means of a small hose to an elevated drain typically a basement window accessing the outside environment, whereby the condensate is pumped periodically and automatically from the condensate drain pan to pass through the hose for dispos al through an elevated drain system or drain field to permit the dehumidifier to operate continuously without the need to periodically empty the collection pan.

The invention will be described for the purposes of illustration only in connection with certain embodiments., however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
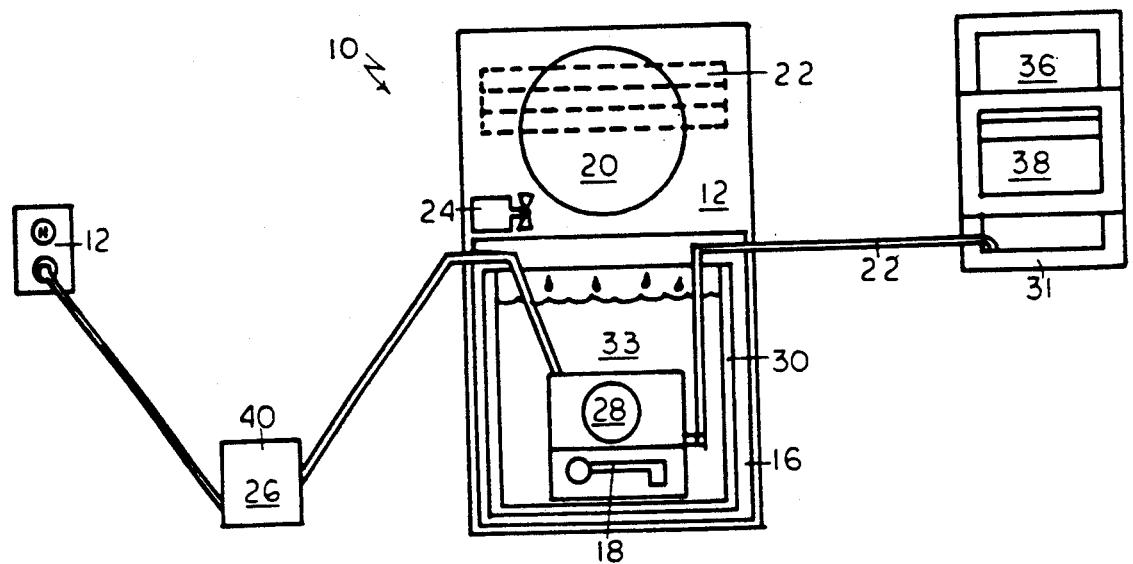
FIG. 1 is a block diagram illustrating a preferred arrangement of a dehumidifier of the invention with the power pack connected directly to the power source.
Figure 2:
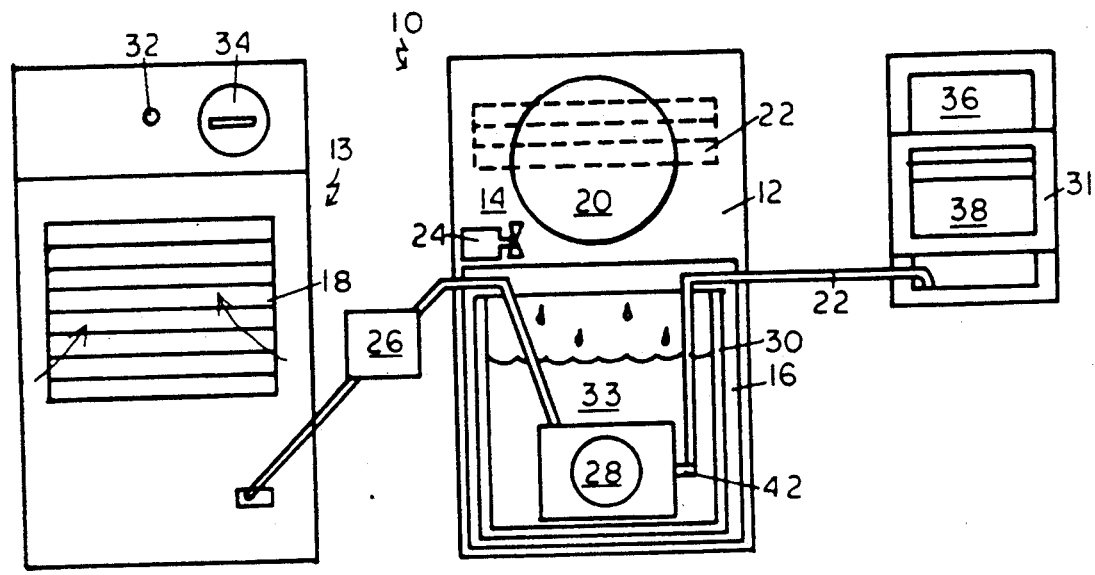
FIG. 2 is a block diagram illustrating an alternative arrangement of a dehumidifier of the invention with the power pack connected to the float switch.

With reference to the drawings, FIG. 1 is a diagrammatic view of the dehumidifier apparatus 10 having a housing 12, having a front cover 13 shown in FIG. 2, an upper chamber 14 and a lower chamber 16, the upper chamber 14 having an air inlet 18 and an air outlet 20 and provided with a dehumidifier means 22 and a motor blower means 24 for drawing outside air into the upper chamber 14 for contacting the dehumidifier means to form condensate to be collected in the collection pan. The dehumidifier apparatus 10 of the invention as shown in FIG. 1 shows an electric power source 11 and a pump pack kit 25 comprising a conventional power pack comprising electric convertor well known in the art connected to an electric pump 28 positioned in a collection pan 30 contained within the housing 12 of the dehumidifier apparatus 10. The pump apparatus 28 includes a float switch 18 and is connected to a tube means 22 extending a substantial distance for positioning in an illustrated casement window 31.

A full light switch 32 is connected to an electrical circuit not shown for indicating when the condensate pan 30 is full of condensate 33 whereupon the circuit and a humidstat control means 34 is provided for controlling the amount of moisture to be removed from the air. Also the window of conventional construction, typically a basement casement window having an upper pane 36 and a lower moveable pane 38 of glass which is slideably mounted for movement between an open and closed position.

The pump pakc kit 14, adapted to be provided individually and attached to the dehumidifier apparatus 10 or alternatively in combination therewith comprises a power pack 26 connected to the power source 11 and is adapted to supply low voltage, typically 12 volt DC power, to the pump 28, having an output port 42 with the pump 28 attached to a wall 50 of the collection pan 30 by attachment 52. A tube means 22 is attached at one end to the output port 42 of the pump 28, with the other end positioned in an elevated drain, typically a casement window 31. The pump 28 includes a float switch means 18 for measuring the level of condensate 33 in the collection pan, 30 said float switch being connected to a conventional on/off switch 44.

What is claimed is:

1. A method for controlling pumping of condensate by a pump means from a portable dehumidifier to an elevated drain which method comprises:
   a) providing a housing including a dehumidifier means;
   b) providing a motor blower means for passing moisture laden air across the dehumidifier means to form condensate droplets on the dehumidifier means;
   c) collecting the condensate droplets dropped from the dehumidifier in a drain pan;
   d) submerging an electrical pump means connected electrically by conduit means to an electrical power source and switching means;
   e) energizing the pump means responsive to a float switch means adapted to selectively determine the level of condensate in the pan requiring removal;
   f) connecting the pump means by means of a small elongated tubing means to an elevated drain to receive the condensate for disposal whereby the condensate is pumped periodically and automatically without interruption from the condensate drain pan through the tubing for dispersal through an elevated drain system or drain field.

2. A dehumidifier apparatus in combination with a pump pack device comprising:
   a) a portable dehumidifier device adapted for use in below grade building locations comprising:
      i) a housing having an air inlet and an air outlet and an upper chamber and a lower chamber;
      ii) an electrically operated dehumidifier means for condensing moisture from the surrounding air and forming liquid water condensate to dehumidify the air;

iii) a collection means including a wall mounted in the base of the housing located in the lower chamber to collect liquid condensate generated by the dehumidifier means located in the upper chamber;

iv) a motor blower means to draw moisture laden air into the air outlet, to circulate the air across the dehumidifier means and to discharge dehumidified air from the air outlet;

v) a switch circuit means for controlling the operation of the dehumidifier;

vi) a float switch means to sense the level of condensate in the collection means connected electrically to the switch circuit for controlling the operation of the dehumidifier to intermittently activate and deactivate the dehumidifier means;

b) a pump pack means to automatically remove liquid condensate from the collection means to permit continuous operation of the dehumidifier means comprising;

i) a submersible electric pump means to pump the liquid condensate from the collection means to an elevated or remote drain via a tube means;

ii) mounting means to attach the submersible pump means to the wall of the collection means;

iii) an electric converter means for converting conventional electric power to low voltage power;

iv) an external tube means having a one end and in other end, the one end attached to the submersible electric pump and the other end adapted to communicate with an elevated, remotely located drain, the tube means being of elongated construction and extending from the submersible electric pump means to provide a conduit for carrying away the water condensate;

v) pump switch means attached to the interior wall of the collection means for sensing the level of the condensate in the collection means connected electrically to the power converter and the electric submersible pump for controlling the operation of the pump for pumping condensate from the collection means into the drain tubing means connected to an elevated drain to permit continuous unattended operation of the dehumidifier apparatus.

3. The apparatus of claim 2 wherein the collection means comprises a collection pan having a side wall.

4. The apparatus of claim 3 wherein the electric submersible pump is electrically powered and is constructed to be submerged in the condensate water and is continuously held in place on the wall of the collection pan by the mounting means.

5. A pump pack apparatus for use with a condensate collection sump of a portable dehumidifier comprising;

a) providing an electrical power source;

b) an electrical submersible pump connected electrically to the power source;

c) a power pack means for converting the power source to a low voltage power source connected to the electric submersible pump;

d) attachment means for attaching the electric submersible pump to a wall of the condensate sump of the portable dehumidifier;

e) an external tubing means having a one and other end, the one end connected to the pump for carrying condensate from the pump to the other end connected to an elevated drain or drain field for disposal;

f) a float switch circuit means positioned in the condensate drain pan for sensing the level of condensate and for selectively activating the electrical submersible pump.

6. The apparatus of claim 5 wherein the attachment means is adapted to mount the pump pack means to a plurality of condensate sump configurations of a plurality of portably dehumidifiers.

* * * * *